(12) United States Patent
Rankin (10) Patent No.: US 9,182,804 B2
(45) Date of Patent: Nov. 10, 2015

(54) OPTICAL NAGIVATION DEVICE

(75) Inventor: Julie M. Rankin, Bonnyrigg (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 267 days.

(21) Appl. No.: 13/606,360

(22) Filed: Sep. 7, 2012

(65) Prior Publication Data

US 2013/0063349 A1    Mar. 14, 2013

(30) Foreign Application Priority Data

Sep. 9, 2011 (GB) .................................. 1115550.4

(51) Int. Cl.
*G06F 3/01* (2006.01)
*G06F 1/32* (2006.01)
*G06F 3/0354* (2013.01)

(52) U.S. Cl.
CPC .......... *G06F 1/3262* (2013.01); *G06F 3/03547* (2013.01); *G06F 2203/0338* (2013.01)

(58) Field of Classification Search
CPC combination set(s) only.
See application file for complete search history.

(56) References Cited

U.S. PATENT DOCUMENTS

| | | | |
|---|---|---|---|
| 8,199,110 B1 * | 6/2012 | Wright ................. | G06F 1/3259 250/221 |
| 2006/0033015 A1 * | 2/2006 | Feldmeier et al. ........... | 250/221 |
| 2006/0140452 A1 * | 6/2006 | Raynor ................. | G06F 1/3203 382/115 |
| 2006/0203101 A1 * | 9/2006 | Silsby ........................ | 348/222.1 |
| 2007/0262243 A1 * | 11/2007 | Cheah et al. .............. | 250/214 R |
| 2008/0011858 A1 * | 1/2008 | Zhu et al. ................. | 235/462.42 |
| 2010/0182270 A1 | 7/2010 | Caliskan et al. | |
| 2010/0302160 A1 * | 12/2010 | Reigneau ............ | G06F 3/03547 345/166 |
| 2011/0080349 A1 | 4/2011 | Holbein et al. | |
| 2011/0090381 A1 * | 4/2011 | Cote et al. ..................... | 348/246 |
| 2011/0093081 A1 * | 4/2011 | Chana .................. | A61B 17/155 623/20.14 |
| 2011/0234541 A1 * | 9/2011 | Reigneau ...................... | 345/175 |
| 2012/0297226 A1 * | 11/2012 | Mucignat .............. | G06F 1/3203 713/323 |
| 2012/0327242 A1 * | 12/2012 | Barley ................... | H04N 5/232 348/155 |
| 2013/0050426 A1 * | 2/2013 | Sarmast et al. ................. | 348/46 |

FOREIGN PATENT DOCUMENTS

WO    2008136551 A1    11/2008

* cited by examiner

*Primary Examiner* — Dwayne Bost
*Assistant Examiner* — Robert Michaud
(74) *Attorney, Agent, or Firm* — Allen, Dyer, Doppelt, Milbrath & Gilchrist, P.A.

(57) ABSTRACT

An optical navigation device may have an adaptive sleep mode for preventing unwanted scrolling inputs. A motion indicator may move a device between a sleep mode and an active mode. According to the sleep mode, a number of different sleep states are defined which have further reduced frame rates. The device may be only woken from the deeper sleep modes once repeated motion events are detected. This may prevent the device from being woken accidentally, while preserving the user experience.

30 Claims, 8 Drawing Sheets

OPTICAL NAGIVATION DEVICE

FIELD OF THE INVENTION

The disclosure relates to an optical navigation device and related methods.

BACKGROUND OF THE INVENTION

Fingermice are increasingly being used on electronic devices, such as mobile phones, keyboards, remote controls, laptops and tablet computers, as a way for providing a scrolling input. A fingermouse typically comprises a light source, an image sensor, and a mousing surface. Radiation is emitted by the light source towards the mousing surface. A user slides a finger across the mousing surface, and the sensor images light reflected by ridges and valleys on the fingerprint of the finger. By comparing subsequent images of the fingerprint captured by the sensor, motion vectors can be extracted. These motion vectors can then be translated into a scrolling input, for example, by a processor external to the image sensor.

As it is necessary for the mousing surface to be accessible, it usually faces the user during normal operation. Therefore, as there is typically a line of sight between the mousing surface and the image sensor, ambient light (e.g. sunlight) may impinge on the image sensor. If the ambient illumination is constant, filtering can reduce its effects. However, moving objects above the mousing surface (e.g. a user's fingers, hands, arms or leaves on a tree) and their shadows can cause changes in the image captured by the image sensor, ultimately causing unwanted scrolling inputs. Similarly, even if the objects above the mousing surface remain substantially still, movement of the device in which the image sensor is housed (e.g. mobile phone) may cause the image to move across the sensor, again causing unwanted scrolling inputs.

One possible solution to reducing unwanted scrolling inputs is to decrease the depth of focus of the imaging optics (e.g. by increasing the aperture or decreasing F number). This reduces the region around the fingermouse in which objects can be captured by the image sensor in sharp focus. However, the amount of blurring is not typically sufficient to prevent unwanted scrolling inputs. Decreasing the depth of focus also requires increased manufacturing tolerances, which increases costs. In addition, increasing the aperture of the imaging optics would require a higher quality and more costly imaging system.

Typically, fingermouse navigation algorithms may require images captured by the sensor to be processed, and a metric for the "number of features" is generated from the image. If this metric is higher than a predetermined threshold, the motion detection algorithm is enabled; otherwise, the motion detection algorithm is disabled. Thus, another possible solution to the problem of unwanted scrolling inputs is to increase the predetermined threshold required to enable the motion detection algorithm. However, this may cause the fingermouse to be unreliable, particularly for users with less well defined fingerprints (e.g. windsurfers). Thus, it is desirable to develop an improved fingermouse that may reduce unwanted scrolling inputs.

SUMMARY OF THE INVENTION

A first aspect of the invention provides an optical navigation device that may comprise an image sensor having a pixel array, and a processor configured to detect motion events from images captured by the pixel array. The image sensor may have a sleep mode in which it is configured to hold a motion indicator in a first state and an active mode in which it is configured to set the motion indicator to a second state different from the first state in response to the detection of a motion event. The image sensor may be configured to change from the sleep mode to the active mode when a second motion event is detected within a first predetermined time period starting from the detection of a first motion event, the image sensor may be configured to hold the motion indicator in the first state between detection of the first and second motion events, but the image sensor may be configured to remain in sleep mode if one or more pixels in the pixel array are saturated.

It may be beneficial to remain in the sleep mode in the event of pixel saturation because saturation is a strong indicator that no user finger is provided over the sensor, which means that any detected movements are "false movements," which should be ignored. The image sensor may be thus configured to hold the motion indicator in the first state between detection of the first motion event and detection of the second motion event.

A motion event may comprise one or more motions. Typically, the first motion event may be detected by comparing a first pair of images, while the second motion event may be detected by comparing a second pair of images different from the first pair of images (although one image may be common to both the first and second pairs of images). By only switching from the sleep mode to the active mode when a plurality of motion events are detected, false inputs caused by unintentional movements being detected by the image sensor may be reduced.

Typically, the image sensor may further comprise a memory configured to buffer motion data derived from the first motion event. This enables data derived from the first motion event to be stored until the image sensor enters the active mode. If the image sensor does not enter the active mode, the data derived from the first motion event may be discarded.

In one embodiment, the image sensor may be configured to change from the sleep mode to the active mode only if a third motion event is also detected within a second predetermined time period starting from the detection of the second motion event. In this case, the image sensor may comprise a memory configured to buffer motion data derived from the first and second motion events.

As before, the third motion event may be detected by comparing a third pair of images different from the first and second pair of images (although there may be one image in common between the second and third pairs of images). By increasing the number of motion events required to change the image sensor from sleep mode to active mode, the number of "false motions" detected by the optical navigation device may be further reduced.

In one embodiment, the image sensor may be configured to set the motion indicator to the second state as soon as it enters the active mode. This is because motion must have occurred if the image sensor has entered the active mode. Where motion data is buffered, setting the motion indicator to the second state as soon as it enters the active mode may cause the buffered motion data to be read by an external processor. This may help to ensure that as few motion events as possible are missed, even when the motion events occur during sleep mode. Alternatively, when the image sensor enters the active mode, prior detected motion events may be discarded, and only subsequent motion events may cause the motion indicator to be set to the second state.

Typically, when the image sensor is in the active mode, the image sensor may be configured to change to the sleep mode when the image sensor is saturated. This is because saturation of the image sensor is a strong indicator that no user finger is provided over the sensor, which means that any detected movements are "false movements" which should be ignored.

Typically, in the sleep mode, the image sensor may be configured to sample images captured by the pixel array at a first frame rate before detection of a first motion event and, in the active mode, the image sensor is configured to sample images captured by the pixel array at a second frame rate greater than the first frame rate. In addition, in the sleep mode, the image sensor may be configured to sample images captured by the pixel array at a third frame rate greater than the first frame rate between detection of the first motion event and detection of the second motion event. The third frame rate may be substantially equal to the second frame rate.

In one embodiment, the optical navigation device may further comprise a radiation source, such as an infrared light emitting diode (IR LED). In this case, the processor may be configured to control the radiation source.

The processor may be configured to process images captured by the pixel array to reduce noise in the images. Typically, this would occur before motion is detected from the images. In one embodiment, the images captured by the pixel array may be edge filtered before motion is detected from the images.

In one embodiment, the first predetermined time period may be preset to between 5 and 12 milliseconds. In one embodiment, the first predetermined time period may be preset to 7 milliseconds. Where three motion events are required, the second predetermined time period may be preset to between 5 and 15 milliseconds. In one embodiment, the second predetermined time period may be preset to 10 milliseconds. In some embodiments, the first and/or second predetermined time period may be user-configurable, i.e. a user can customize these time periods. In certain embodiments, the processor may be configured to detect a motion event only when a threshold number of features can be identified in at least one of the images captured by the pixel array.

Additionally, the optical navigation device may further comprise an exposed mousing surface. A mousing surface is an input surface via which a user can provide inputs to the navigation device. As explained above, inputs may be detected by changes in images captured by the image sensor when an object moves across the mousing surface. Also, the mousing surface may be arranged to face a user when the device is in use.

Another aspect is directed to a method of operating an optical navigation device. The method may comprise configuring the image sensor in a sleep mode in which a motion indicator is held in a first state, detecting a first motion event from images captured by a pixel array of an image sensor, detecting a second motion event from images captured by the pixel array of the image sensor, and changing the image sensor to an active mode in which it is configured to set a motion indicator to a second state different from the first state in response to the detection of a motion event. The image sensor may be changed to the active mode when the second motion event is detected within a first predetermined time period starting from the detection of the first motion event. The image sensor may be configured to hold the motion indicator in the first state between detection of the first and second motion events, but where the method further comprises testing the image sensor for saturation before implementing holding the image sensor in sleep mode if one or more pixels in the pixel array are saturated.

In some embodiments, the method may further comprise detecting a third motion event from images captured by the image sensor, the image sensor changing to the active mode only if the third motion event is also detected within a second predetermined time period starting from detection of the second motion event. In one embodiment, the method may further comprise changing the image sensor to the sleep mode if no motion events are detected within a third predetermined time period starting from the detection of a previous motion event.

Another aspect is directed to a fingermouse that may comprise an image sensor having a pixel array, and a processor configured to detect motion events from images captured by the pixel array. The image sensor may have a sleep mode in which it is configured to hold a motion indicator in a first state and an active mode in which it is configured to set the motion indicator to a second state different from the first state in response to the detection of a motion event. The image sensor may be configured to change from the sleep mode to the active mode when a second motion event is detected within a first predetermined time period starting from the detection of a first motion event. The image sensor may be configured to hold the motion indicator in the first state between detection of the first and second motion events, but the image sensor may be configured to remain in sleep mode if one or more pixels in the pixel array are saturated.

Another aspect is directed to an electronic communications device. The electronic communications device may comprise an optical navigation device comprising an image sensor having a pixel array, and a processor configured to detect motion events from images captured by the pixel array. The image sensor may have a sleep mode in which it is configured to hold a motion indicator in a first state and an active mode in which it is configured to set the motion indicator to a second state different from the first state in response to the detection of a motion event. The image sensor may be configured to change from the sleep mode to the active mode when a second motion event is detected within a first predetermined time period starting from the detection of a first motion event. The image sensor may be configured to hold the motion indicator in the first state between detection of the first and second motion events, but the image sensor may be configured to remain in sleep mode if one or more pixels in the pixel array are saturated.

Additional aspects are directed respectively to a mobile phone, a remote control, a computer or tablet computer comprising an optical navigation device comprising an image sensor having a pixel array, and a processor configured to detect motion events from images captured by the pixel array. The image sensor may have a sleep mode in which it is configured to hold a motion indicator in a first state and an active mode in which it is configured to set the motion indicator to a second state different from the first state in response to the detection of a motion event. The image sensor may be configured to change from the sleep mode to the active mode when a second motion event is detected within a first predetermined time period starting from the detection of a first motion event. The image sensor may be configured to hold the motion indicator in the first state between detection of the first and second motion events, but the image sensor may be configured to remain in sleep mode if one or more pixels in the pixel array are saturated.

BRIEF DESCRIPTION OF THE DRAWINGS

An embodiment of the disclosure will now be described, by way of example only, with reference to the drawings, in which.

DETAILED DESCRIPTION OF THE PREFERRED EMBODIMENTS

Figure 1:
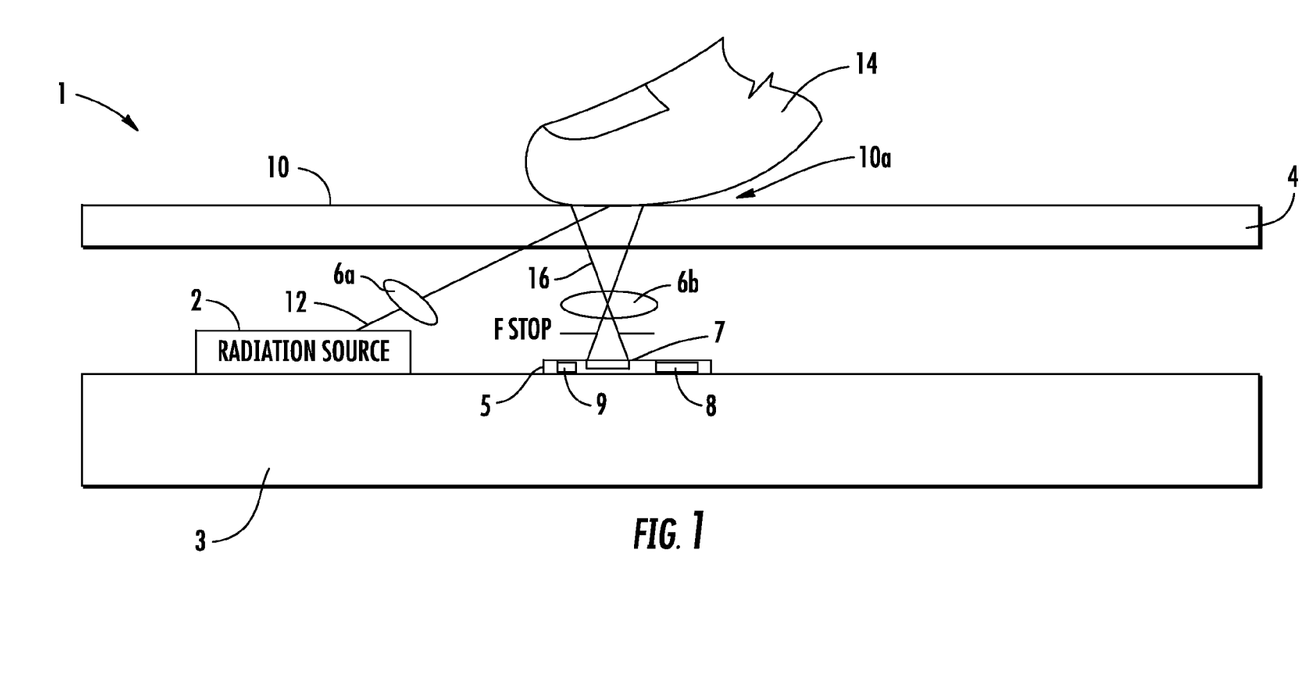
FIG. 1 provides a schematic view of an optical navigation device, according to the present invention.

FIG. 1 is a schematic side view of an optical navigation device 1 comprising a radiation source 2 (such as an IR LED) mounted on a substrate 3, a plastic layer 4 substantially transparent to the radiation emitted by the radiation source 2, and an image sensor 5. A collimation lens 6a may be provided over the radiation source to collimate the radiation beam output by the radiation source 2 and a magnification lens 6b may be provided over the image sensor 5. The image sensor 5 comprises a pixel array 7, a processor 8, and a memory 9. As shown in FIG. 1, the plastic layer 4 comprises an upper user input face 10. A touch sensitive "mousing surface" 10a (which is exposed to the ambient environment) is formed at an intermediate region of the user input face 10. The position and surface area of the mousing surface 10a is defined by the area of the user input face 10, which is illuminated by the radiation source 2. This depends on the divergent angle of the radiation beam emitted from the source 2 (before it reaches the collimation lens 6a if provided) and the angle of inclination of the principal emission axis of the radiation source 2 relative to the user input face 10.

In the present embodiment, the pixel array 7 may comprise a 20×20 array of 30 μm CMOS pixels. However, it will be understood that other array sizes/architectures may be employed and that any suitable alternative technology to CMOS (such as CCD) may be used in the pixels. The sensor further comprises a signal processor.

The radiation source 2, the image sensor 5, and the plastic layer 4 are together arranged such that, when radiation 12 is emitted by the radiation source 2, it enters the (substantially transparent) plastic layer 4. Typically, the angle of incidence of the radiation beam on the lower (internal) surface of the user input face 10 is less than the critical angle for total internal reflection. As such, when no objects are in contact with the mousing surface 10a, the radiation emitted by the radiation source passes through the plastic layer 4 and is lost from the device. However, if an object, such as a user's digit (finger) 14, comes into contact with the mousing surface 10a, a portion of the radiation 16 emitted by the source 2 is reflected back into the device by the digit 14 onto the pixel array 7.

Figure 2:
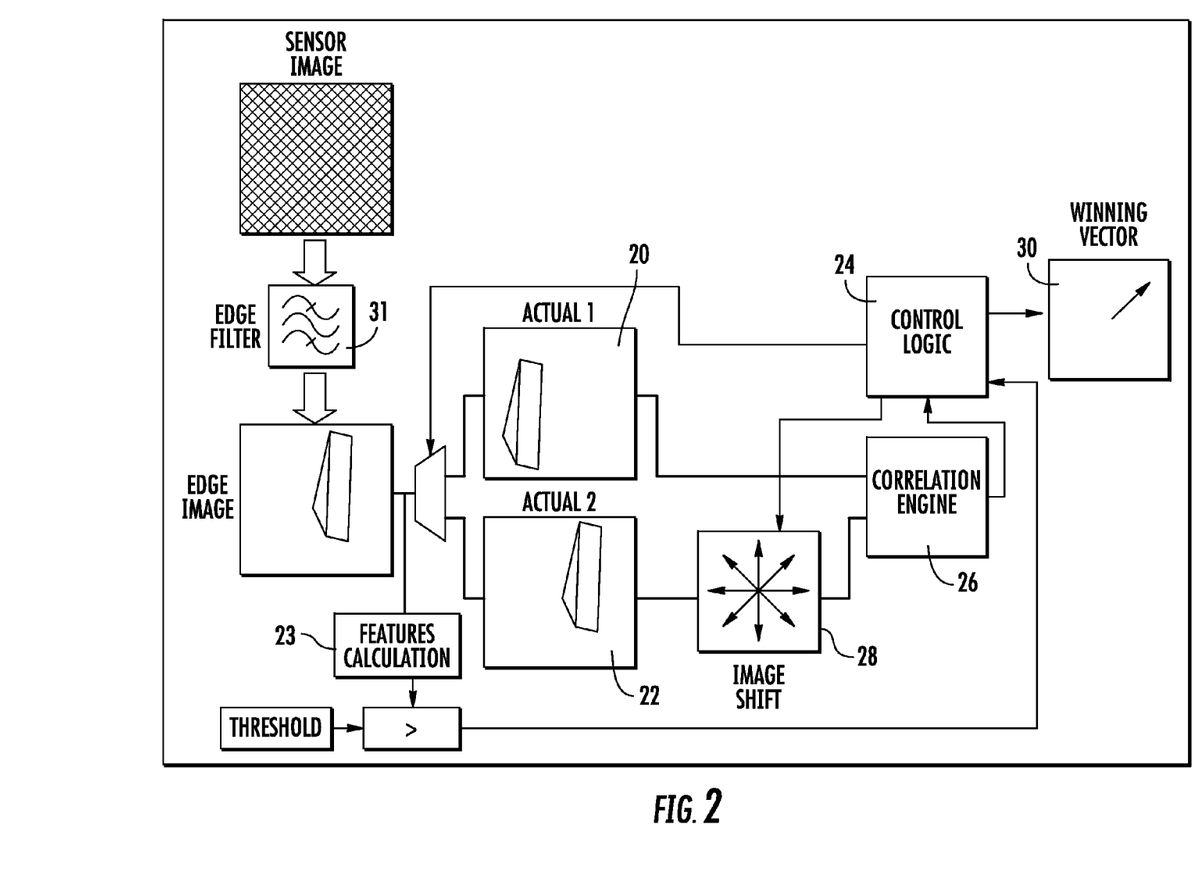
FIG. 2 provides a schematic block diagram of an implementation of a sum of absolute differences algorithm for determining a motion vector from data taken from subsequent images, according to the present invention.

The navigation device 1 is operated by sliding a digit 14 across the mousing surface 10a. As the finger 14 moves across the surface, the image formed on the pixel array 7 changes accordingly. As illustrated in FIG. 2, user input information may be derived by comparing data from sequential image frames 20, 22 detected by the pixel array V. The processor 8, which includes features calculation circuitry 23, control logic 24, correlation engine 26 and image shift circuitry 28, processes successive image patterns to identify the point or points of contact of the finger on the mousing surface 10a and to determine motion vectors and the rate of movement of one or more features from one frame to the next.

When an image is captured by the pixel array, it is firstly processed by the features calculation circuitry 23 to determine the number of features in the image. If the number of features identified is greater than the predetermined (but preferably user configurable) threshold, the following motion detection algorithm is performed.

Data from the acquired image is compared with data from a previously acquired image to determine a motion vector, which can subsequently be translated into scrolling input data, by employing a sum of absolute differences (SAD) algorithm. Typically, a previously determined motion vector (Xshift, Yshift) may be taken as a first estimate of the motion between the two images. One or more features from the previously acquired image are shifted by the image shift circuitry 28 using this motion vector, and the shifted image is compared to the acquired image using the correlation engine 26. The absolute differences between corresponding pixel values are then added together to provide a SAD value which is stored.

Next, the motion vector is altered and the previously acquired image is shifted by the altered motion vector using the image shift circuitry 28 and another SAD value is computed by comparing the newly shifted image with the acquired image using the correlation engine 26. This process is repeated a number of times to provide a corresponding number of SAD values.

The minimum SAD value indicates which motion vector results in the closest match between the two images. Thus, the shift applied to the previously acquired image to obtain the minimum SAD value is taken to be the "winning vector" 30. The winning vector 30 may be stored in sensor memory 9, while any other vectors calculated may be discarded. The winning motion vector 30 can then be translated into an appropriate control action (e.g. cursor movement on a mobile communications device or mobile computer—see FIG. 9). Typically, the winning motion vector 30 is calculated before the next image is captured by the image sensor 5 (i.e. the calculation time is typically less than 1/frame rate).

As illustrated in FIG. 2, each image captured by the image sensor may also be passed through an edge filter 31 in order to remove low spatial frequency variations, and to enhance high spatial frequency variations in the image. This helps to reduce the effects of uneven illumination across the imaging surface. Typically, this is done before images are compared to extract motion vectors.

The image sensor 5 is typically provided with an "active mode" in which it is intended to operate when receiving scrolling inputs, and a "sleep mode" in which it is intended to operate when not receiving scrolling inputs in order to save power. In active mode, images are sampled from the pixel array 7 at a relatively high frame rate of, for example, 1 kfps (1000 frames per second), in order to detect fine movements.

Typically, when the optical navigation device 1 is in use, an external processor monitors a "motion indicator" set by the image sensor 5 to indicate when motion has been detected.

The motion indicator is provided with a first (disabled) state, which indicates that no motion has been detected, and a second (enabled) state (different from the first state) which indicates that motion has been detected. Thus, a motion indicator in the second state would prompt an external processor to read the motion vector calculated by the image sensor 5 and stored in memory 9. When the image sensor 5 is in active mode, it is configured to set the motion indicator to the second state in response to the detection of motion.

Figure 3:
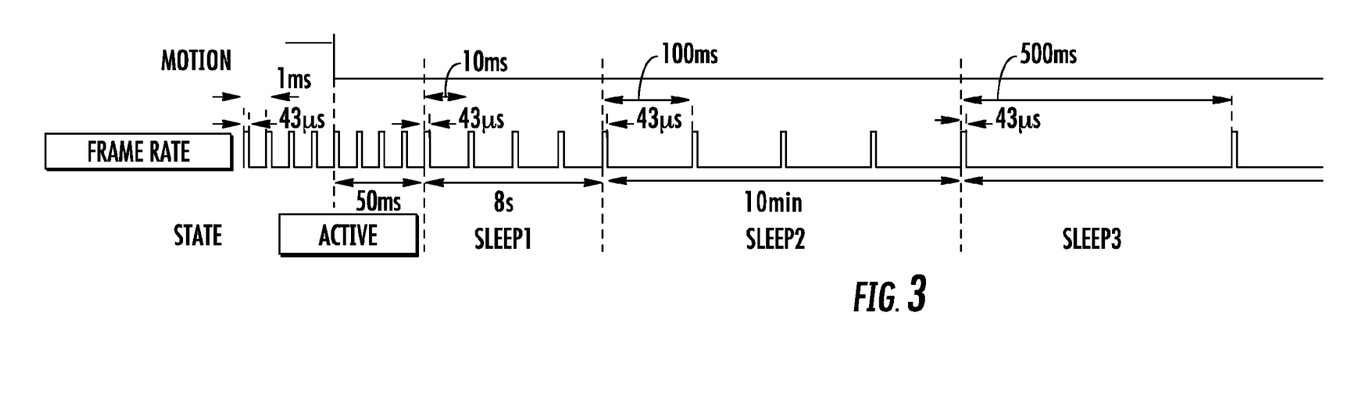
FIG. 3 is a timing diagram illustrating an adaptive sleep mode, according to the present invention.

When no motion is detected within a set time period (illustrated as 50 milliseconds in the example shown in FIG. 3), the image sensor 5 may enter the sleep mode, in which the image sensor 5 may be provided with a reduced frame rate (100 fps in the example shown in FIG. 3) in order to save power. In one embodiment, the sleep mode may be an adaptive sleep mode as illustrated in FIG. 3. In the adaptive sleep mode shown in FIG. 3, if no movement is detected in a second set time period (8 seconds from the end of the first set time period in the example shown in FIG. 3), the device enters a second sleep mode having a further reduced frame rate (10 fps in the example shown FIG. 3) to further save power. In addition, if still no movement is detected in a third set time period (10 minutes from the end of the second predetermined time period in the example shown in FIG. 3), the device enters a third sleep mode where the frame rate is yet further reduced (2 fps in the example shown in FIG. 3) to yet save more power.

In addition, when the image sensor 5 is in the sleep mode, it is configured to hold the motion indicator in the first (disabled) state. Only when the image sensor 5 switches from sleep mode to active mode can the motion indicator be set to its second (enabled) state.

Figure 6:
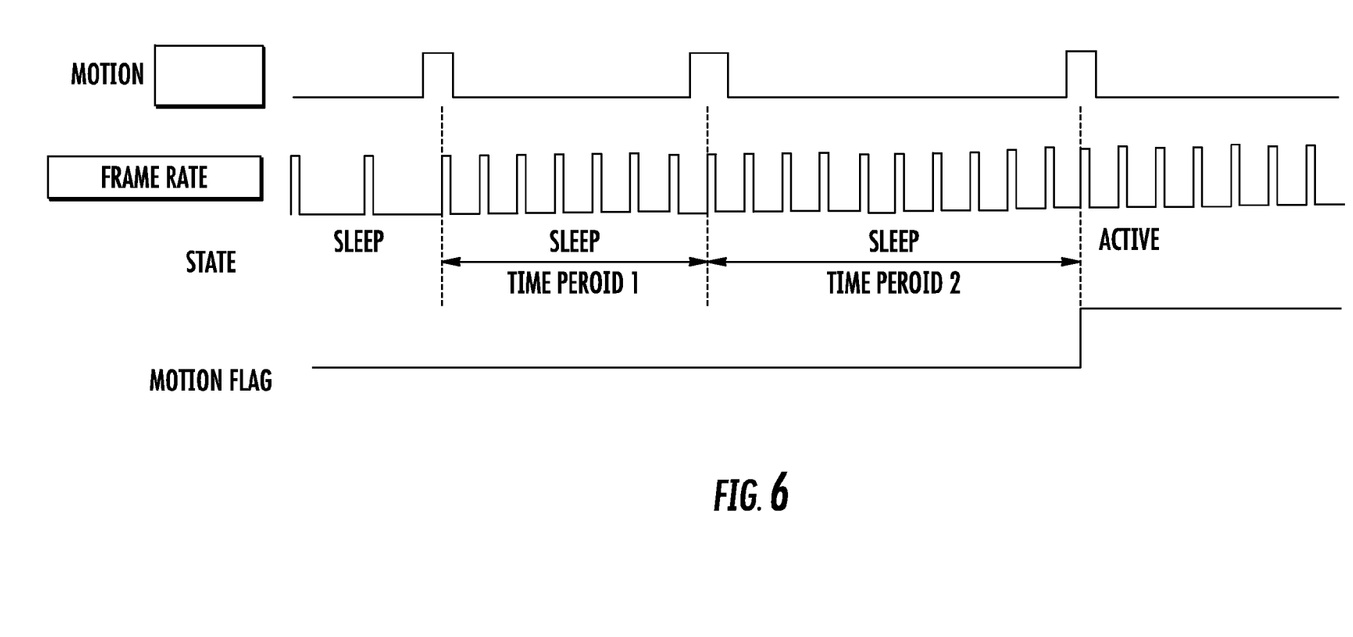
FIG. 6 is a timing diagram illustrating the improved "wake-up" algorithm of FIG. 5, according to the present invention.

It will be understood that the motion indicator can take any suitable form. For example, as illustrated in FIG. 6, the motion indicator may be a binary flag, the first (disabled) state being a binary "0" and the second (enabled) state being a binary "1". The opposite polarity may alternatively be applied (i.e. binary "1" for the first state, binary "0" for the second state). Typically the motion indicator is, by default, set in the first state. The motion indicator may be a flag output directly by the image sensor 5. Alternatively, the motion indicator may be a value stored in a register of the image sensor memory 9.

As a further alternative, the motion indicator may be a parameter which, when in its second state, actively causes the winning motion vector 30 to be output from the image sensor 5 (so that it can be read by an external processor) and, when in its first state prevents the winning motion vector 30 from being output by the image sensor 5.

Figure 4:
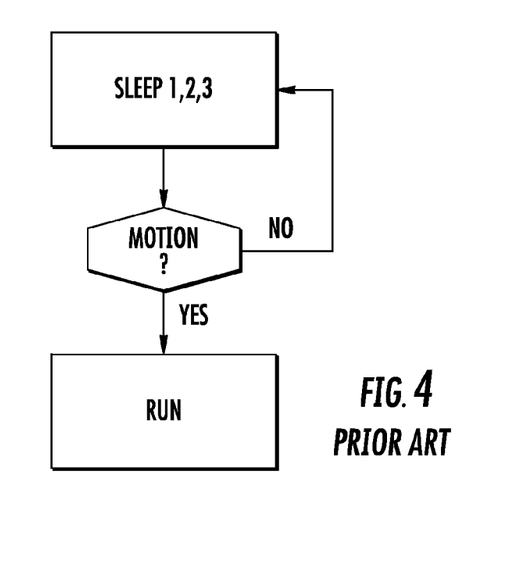
FIG. 4 is a flowchart of a "wake-up" algorithm used by optical navigation devices, according to the prior art.

As explained hereinabove, a problem with typical optical navigation devices is that unwanted scrolling inputs can be provided when the image sensor 5 unintentionally detects movement. In typical optical navigation devices, the algorithm of FIG. 4 may be applied to determine when to switch the sensor 5 from the sleep mode to the active mode in order to accurately capture user inputs. In this algorithm, any motion detected by the image sensor 5 at any time will cause it to immediately switch from the sleep mode to the active mode.

When "false inputs" unintentionally cause the image sensor 5 to switch to active mode, problems can arise during user operation. For example, if the optical navigation device 1 is employed on a mobile phone, and a user is using keys on the phone's keypad (e.g. the user is inputting a text message), the image sensor 5 may unintentionally "wake" as a result of movement of the user's fingers being detected by the image sensor, resulting in unwanted scrolling inputs which can disrupt/corrupt the intended user input. It has been discovered that significant problems can arise in the presence of strong sunlight.

Figure 5:
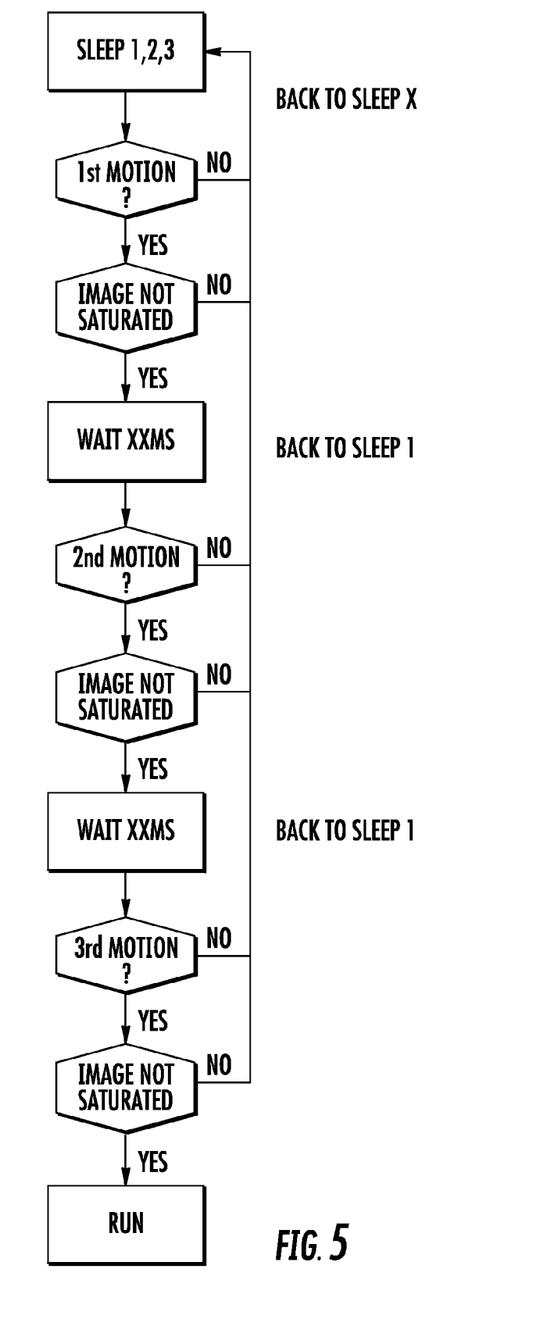
FIG. 5 is a flowchart of a "wake-up" algorithm, according to the present invention.

An improved algorithm is shown in FIGS. 5 and 6. As above, it is assumed that the optical navigation device begins in sleep mode (i.e. the motion indicator is held in the first state). When a first motion event (see the top row of FIG. 6) is detected by the image sensor 5, a first motion vector is calculated (as explained with reference to FIG. 2 above) and stored in memory 9. As shown in FIG. 6, the image sensor 5 remains in sleep mode at this point (i.e. the motion indicator continues to be held in the first state), but the frame rate may be increased, for example, to the frame rate employed in the active mode (1000 fps in this illustrative example). In addition, a timer is started. If, within a first predetermined time period (e.g. 7 milliseconds) starting from detection of the first motion event, a second motion event is detected, a second motion vector is calculated and stored in memory 9. Again, the motion indicator continues to be held in the first state. The timer is then restarted (or a new timer is started). If, within a second predetermined time period (e.g. 10 milliseconds) starting from detection of the second motion event, a third motion event is detected, a third motion vector is calculated and stored in memory 9. Detection of the third motion event also causes the optical navigation device to enter the "active" state. That is, the image sensor is configured to set the motion indicator to the second state in response to detection of a motion event (see FIG. 6).

Because a detected motion event causes the sensor 5 to enter into the active mode, the motion indicator may immediately be set to the second state when the image sensor 5 enters the active mode and the first, second, and third motion vectors may be made available for reading in memory 9 by an external processor. Thus, because the first, second, and third motion vectors are stored in the image sensor memory 9, few (if any) motions are "missed" when the device is in the sleep mode. It will be understood that the first, second, and third motion events used to wake the device may alternatively be discarded after the device enters the active mode and only subsequent motion events detected by the image sensor 5 (while it is in the active mode) may cause the motion indicator to be set to its second state.

In FIG. 6, the time at which the first, second, and third motion events occur overlap with frames being captured by the image sensor 5 (as illustrated by the coincidence in time of a respective frame capture spike and each motion event). It will be understood that, if motion occurs between frames, it will not be captured by the image sensor 5. However, the frame rates can be tuned to ensure that most (if not all) motions are captured by the image sensor 5.

In addition, although FIG. 6 shows a motion event being detected (illustrated b the first and second time periods starting) at the same time as an image is captured, it will be understood that there will be a small time delay between capturing the image and detection of motion due to the processing time required to detect motion from the images (see above explanation with reference to FIG. 2). However, typically, the processing time is at least an order of magnitude lower than the time period between successive frames. Similarly, there will be a (albeit typically extremely short) time lag between detection of the third motion and the changing of the state of the motion indicator because of the time taken for electronic signals to propagate within the sensor.

It will be understood that the predetermined time periods between the first and second, and second and third motions, are typically terminated as soon as a motion event is detected within those periods. That is, the time period for testing for the second motion event begins as soon as the first motion event is detected, while the time period for testing for the third motion event begins as soon as the second motion event is detected.

As shown in FIG. 6, the motion indicator may remain set to the second state until the winning motion vector 30 has been read by an external processor, at which point it may be reset to its default first state. Subsequent motions detected by the image sensor (while in the active mode) again cause the motion indicator to be set to its second state. This continues until no motion events are detected for the first set time period (50 ms in the example of FIG. 3), in which case the image sensor 5 re-enters the sleep mode. At this point, the above algorithm must be repeated to change the image sensor 5 from the sleep mode to the active mode.

By increasing the frame rate after detection of the first motion, subsequent motions can be detected within a much shorter time period than would be possible if the "sleep" frame rate was maintained (which, as described above, may be as low as 2 fps). However, by keeping the device in sleep mode (where the motion indicator is disabled) until three motions have been detected, unwanted scrolling inputs are discarded.

Conversely, if no second or third motion events are detected within the first/second predetermined time periods, the optical navigation device remains in sleep mode. In the case where an adaptive sleep mode is implemented, the frame rate may be decreased in stages as described above with reference to FIG. 3 (starting at the end of the first predetermined time period if no second motion event is detected within that period or, if a second motion event is detected within that time period, at the end of the second predetermined time period starting from the detection of the second motion event). Alternatively, the frame rate may be reduced back to the frame rate in which the image sensor was operating immediately before detection of the first motion event. In addition, the first motion vector (and, if a second motion event is detected in the first predetermined time period, the second motion vector) may be discarded.

By setting more than one "test" (i.e. more than one motion event needs to be detected), which the motion detected by the image sensor 5 must pass in order to switch the sensor 5 from sleep mode to active mode, unwanted scrolling inputs are greatly reduced. This is because a more deliberate action is required to wake the optical navigation device from the sleep mode, and because the motion indicator is disabled when the sensor 5 is in the sleep mode.

Figure 7A:
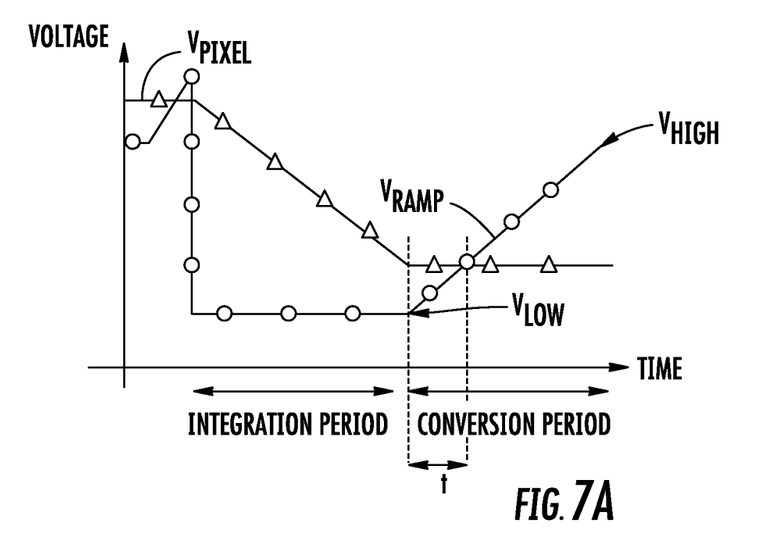
FIGS. 7a and 7b are plots of voltage versus time, FIG. 7a showing a situation where the pixel is unsaturated by incident light and FIG. 7b showing a situation where the pixel is saturated by incident light, according to the present invention.
Figure 7B:
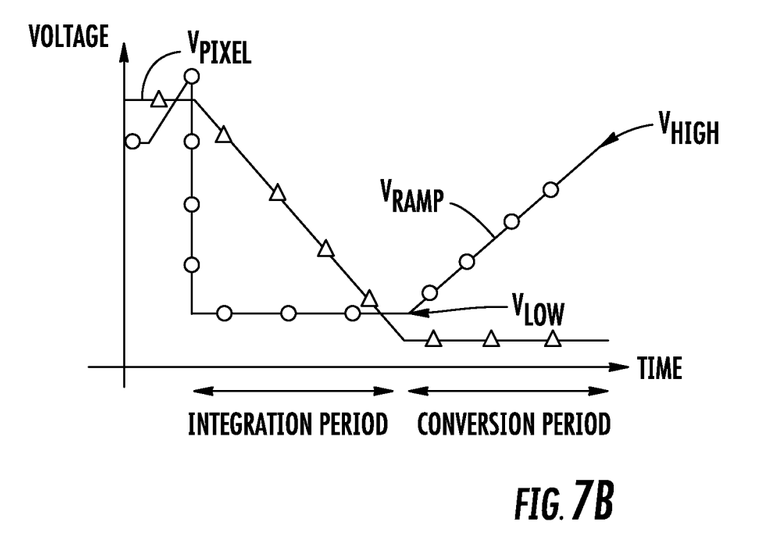

It will be understood that each pixel typically comprises a photodiode and an analog-to-digital converter (ADC). Typically, when no light is impinging on a given pixel, the pixel voltage Vpixel will charge up to a "charged" state. Light (e.g. from the radiation source 2 or from an external light source such as the sun) impinging on the photodiode during an "integration period" generates electrons which cause the pixel to discharge. This is illustrated in FIGS. 7a and 7b, which show graphs of voltage against time, Vpixel being illustrated by the line comprising triangular symbols. The greater the quantity of light incident on the pixel photodiode during the integration period, the greater Vpixel decreases with respect to the charged state.

The ADC typically comprises a comparator, which compares a voltage ramp signal, VRAMP with the pixel voltage, Vpixel. VRAMP is illustrated in FIGS. 7a and 7b by the line comprising circular symbols. VRAMP increases from a lower voltage, Vlow, to a higher voltage, Vhigh (greater than the Vlow) at a (typically) constant gradient. The range between the lower voltage and higher voltage is known as the conversion range of the ADC.

Analog-to-digital conversion typically occurs in a "conversion" period which follows the integration period. VRAMP increases from Vlow at the start of the conversion period to Vhigh at the end of the conversion period. When Vpixel is greater than VRAMP, the comparator may output a "low" signal and when VRAMP is greater than Vpixel, the comparator may output a "high" signal. As shown in FIG. 7a, the time, t, taken for the output of the comparator to toggle from low to high can be used in combination with Vlow, the gradient of VRAMP, and the charged state voltage of Vpixel to determine the voltage swing on Vpixel. From this voltage swing, the ADC can derive the quantity of light which impinged on the pixel photodiode during the integration period.

If, during the integration period, too much light is incident on the pixel photodiode, Vpixel may discharge to a level below Vlow (i.e. Vpixel discharges to a level outside the range of conversion of the ADC). This is illustrated in FIG. 7b. In this case, the time it takes for VRAMP to increase to a level equal to Vpixel cannot be measured (since VRAMP is always greater than Vpixel), and the pixel is saturated.

As shown in FIG. 5, the "wake-up" algorithm may include a test for saturation of the image sensor. More specifically, when each motion is detected, a corresponding test may be undertaken for saturation of the pixels of the array 7. Typically, the test may comprise comparing Vpixel with a predetermined threshold voltage (which typically may be Vlow) following the integration period. If Vpixel is less than the threshold voltage, the pixel may be considered saturated; if Vpixel is greater than the threshold voltage, the pixel may be considered unsaturated.

If one or more pixels of the array 7 are saturated, the image sensor 5 remains in sleep mode. This is because saturation of one or more pixels provides a strong indication that there is no finger over the mousing surface and thus that any motion detected does not correspond to an intentional input. Thus, the image sensor 5 remains in sleep mode in the event of saturation, regardless of how many motions are detected. It will be understood that, as an alternative to the algorithm shown in FIG. 5, the saturation test may only be performed when the first motion is detected.

Figure 8:
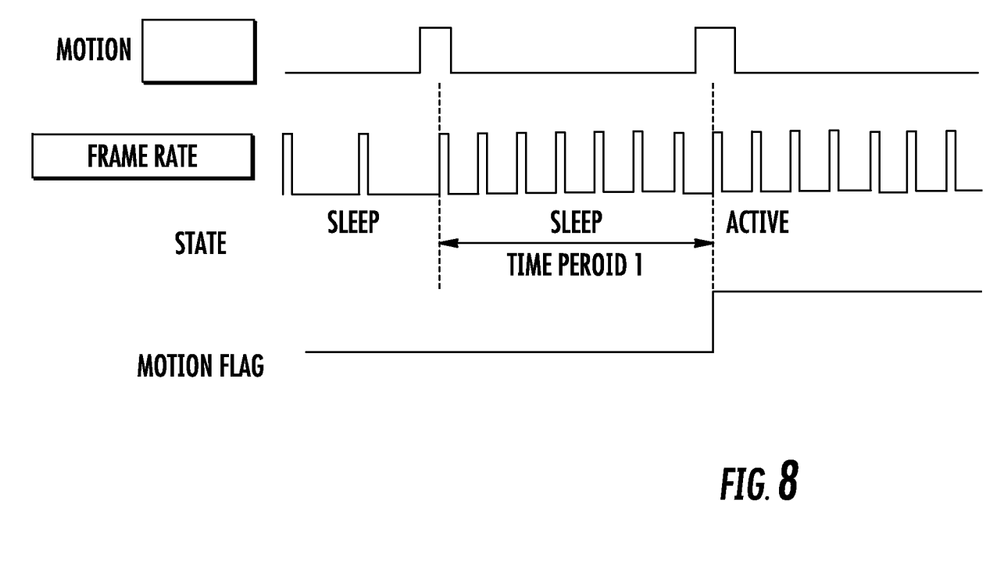
FIG. 8 is a timing diagram illustrating another embodiment of a "wake-up" algorithm, according to the present invention.

It will be understood that, although the above embodiment my require three motions to be detected before the optical navigation device switches from sleep mode to active mode, the image sensor 5 may be configured such that only two motions may be required to switch the sensor 5 from sleep mode to active mode. This is illustrated in FIG. 8. In this embodiment, if within the first predetermined time period (e.g. 7 milliseconds) starting from detection of the first motion, a second motion is detected, the optical navigation device may enter the active mode. Although the above embodiment (which requires three motions to be detected) may be advantageous, the present embodiment (which requires only two motions to be detected) still provides reduced unwanted scrolling inputs compared to typical algorithms.

It will be understood that alternative algorithms may be provided to require additional (i.e. fourth, fifth and above) motions to switch the image sensor from sleep mode to active mode. Indeed, increasing the number of motions required to four motions may be beneficial in specific cases (for example, where the optical navigation device is used under high levels of sunlight). Similarly, increasing the number of motions required to five may also be particularly beneficial. However, it will also be understood that there is a trade-off between decreasing the number of false scrolling inputs and increasing the time and effort required for a user to wake the device, both of which occur when the number of motions required for waking the image sensor increases. Optimally, the number of motions required to switch the image sensor 5 from sleep mode to active mode may be user-configurable (i.e. programmable by the user) so that the configuration can be adapted to particular environments.

Figure 9:
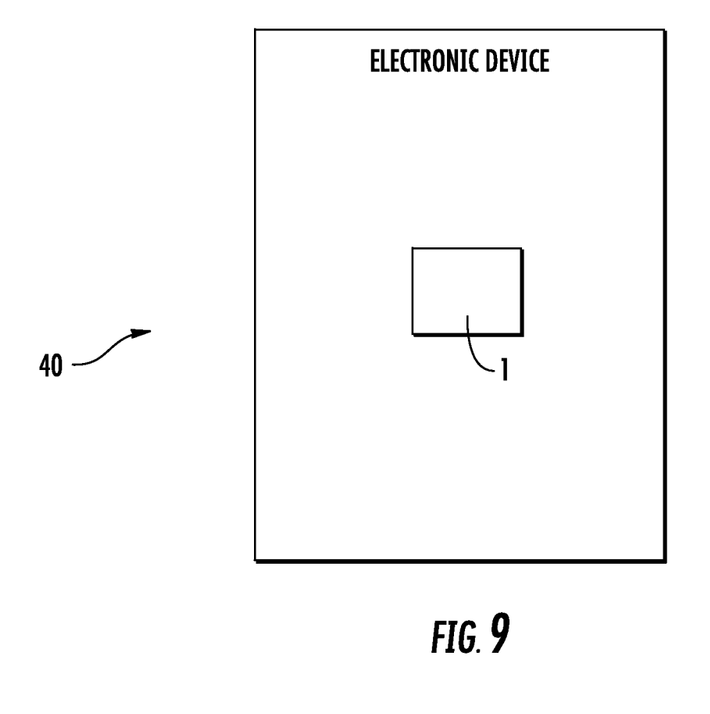
FIG. 9 is a schematic block diagram of an electronic apparatus comprising the optical navigation device of FIG. 1.

Preferably, the first and second predetermined time periods within which the second and, if applicable, third motions must be detected to switch the optical navigation device to its active mode are also user-configurable (i.e. programmable). This allows the user to customize how far to inhibit unwanted movement. FIG. 9 shows an electronic device 40, such as a mobile phone, a keyboard, a remote control, a tablet computer, a laptop or a computer comprising the optical navigation device 1.

While this detailed description has set forth some embodiments of the present disclosure, the appended claims cover other embodiments of the present disclosure, which may differ from the described embodiments according to various modifications and improvements.

That which is claimed is:

1. An optical navigation device comprising:
   a touch input surface;
   an optical source configured to direct optical radiation towards said touch input surface, the optical radiation to be reflected from an object adjacent said touch input surface;
   an image sensor comprising
      a pixel array configured to capture a plurality of images from said touch input surface, and
      a processor coupled to said pixel array and configured to detect at least one motion event associated with the object from the plurality of images;
   said image sensor configured to operate in one of a sleep mode for holding a motion indicator in a first state, and an active mode for setting the motion indicator to a second state different from the first state;
   said processor configured to, while in the sleep mode,
      detect a first motion event,
      buffer motion data derived from the first motion event, and
      change from the sleep mode to the active mode and provide the buffered motion data to be read external of the optical navigation device when a second motion event is detected within a first time period from the detection of the first motion event, but remain in the sleep mode and discard the buffered motion data if at least one pixel in said pixel array is saturated.

2. The optical navigation device of claim 1 wherein said image sensor is configured to change from the sleep mode to the active mode only if a third motion event is also detected within a second time period from the detection of the second motion event.

3. The optical navigation device of claim 2 wherein the second time period is between 5 and 15 milliseconds.

4. The optical navigation device of claim 2 wherein the second time period is user-configurable.

5. The optical navigation device of claim 1 wherein said image sensor is configured to set the motion indicator to the second state when entering the active mode.

6. The optical navigation device of claim 1 wherein, when said image sensor is in the active mode, said image sensor is configured to change to the sleep mode when said image sensor is saturated.

7. The optical navigation device of claim 1 wherein, in the sleep mode, said image sensor is configured to sample the plurality of images captured by said pixel array at a first frame rate before detection of the first motion event and, in the active mode, said image sensor is configured to sample the plurality of images captured by said pixel array at a second frame rate greater than the first frame rate.

8. The optical navigation device of claim 7 wherein, in the sleep mode, said image sensor is configured to sample the plurality of images captured by said pixel array at a third frame rate greater than the first frame rate between detection of the first motion event and detection of the second motion event.

9. The optical navigation device of claim 8 wherein the third frame rate is substantially equal to the second frame rate.

10. The optical navigation device of claim 1 wherein said processor is configured to control said optical source.

11. The optical navigation device of claim 1 wherein said processor is configured to process the plurality of images captured by said pixel array to reduce noise in the plurality of images.

12. The optical navigation device of claim 1 wherein said processor is configured to edge filter the plurality of images captured by said pixel array.

13. The optical navigation device of claim 1 wherein the first time period is between 5 and 12 milliseconds.

14. The optical navigation device of claim 1 wherein the first time period is user-configurable.

15. The optical navigation device of claim 1 wherein said processor is configured to detect a motion event only when a threshold number of features can be identified in at least one image captured by the pixel array.

16. The optical navigation device of claim 1 wherein said touch input surface comprises an exposed mousing surface adjacent said image sensor.

17. The optical navigation device of claim 16 wherein said mousing surface is arranged to face a user.

18. A fingermouse comprising:
   a touch input surface;
   an optical source configured to direct optical radiation towards said touch input surface, the optical radiation to be reflected from an object adjacent said touch input surface;
   an image sensor comprising
      a pixel array configured to capture a plurality of images from said touch input surface, and
      a processor coupled to said pixel array and configured to detect at least one motion event associated with the object from the plurality of images;
   said processor configured to
      operate said image sensor in one of a sleep mode for holding a motion indicator in a first state, and an active mode for setting the motion indicator to a second state different from the first state;
   said processor configured to, while in the sleep mode,
      detect a first motion event,
      buffer motion data derived from the first motion event, and
      change from the sleep mode to the active mode and provide the buffered motion data to be read external of the fingermouse when a second motion event is detected within a first time period from the detection of the first motion event, but remain in the sleep mode and discard the buffered motion data if at least one pixel in said pixel array is saturated.

19. The fingermouse of claim 18 wherein said image sensor is configured to change from the sleep mode to the active mode only if a third motion event is also detected within a second time period from the detection of the second motion event.

20. The fingermouse of claim 18 wherein said image sensor is configured to set the motion indicator to the second state when entering the active mode.

21. An electronic device comprising:
a computing device comprising an optical navigation device, said optical navigation device comprising
a touch input surface,
an optical source configured to direct optical radiation towards said touch input surface, the optical radiation to be reflected from an object adjacent said touch input surface, and
an image sensor comprising
a pixel array configured to capture a plurality of images from said touch input surface, and
a processor coupled to said pixel array and configured to detect at least one motion event associated with the object from the plurality of images;
said processor configured to
operate said image sensor in one of a sleep mode for holding a motion indicator in a first state, and an active mode for setting the motion indicator to a second state different from the first state,
said processor configured to, while in the sleep mode,
detect a first motion event,
buffer motion data derived from the first motion event, and
change from the sleep mode to the active mode and provide the buffered motion data to be read external of the optical navigation device when a second motion event is detected within a first time period from the detection of the first motion event, but remain in the sleep mode and discard the buffered motion data if at least one pixel in said pixel array is saturated.

22. The electronic device of claim 21 wherein said image sensor is configured to change from the sleep mode to the active mode only if a third motion event is also detected within a second time period from the detection of the second motion event.

23. The electronic device of claim 21 wherein said image sensor is configured to set the motion indicator to the second state when entering the active mode.

24. The electronic device of claim 21 wherein said computing device comprises at least one of a mobile phone, an electronic communications device, a remote control device, and a tablet computer device.

25. A method of operating an optical navigation device comprising:
configuring an image sensor in the optical navigation device to be in a sleep mode for holding a motion indicator in a first state, the optical navigation device comprising a touch input surface, and an optical source to direct optical radiation towards the touch input surface, the optical radiation to be reflected from an object adjacent the touch input surface;
while in the sleep mode, detecting a first motion event associated with the object from a plurality of images captured by a pixel array of the image sensor, the plurality of images being of the touch input surface;
while in the sleep mode, detecting a second motion event associated with the object from the plurality of images captured by the pixel array of the image sensor;
while in the sleep mode, buffering motion data derived from the first motion event, and
while in the sleep mode, changing the image sensor to an active mode for setting the motion indicator to a second state different from the first state and providing the buffered motion data to be read external of the optical navigation device when the second motion event is detected within a first time period from the detection of the first motion event; and
testing the image sensor for saturation before implementing the changing, and holding the image sensor in the sleep mode and discarding the buffered motion data if at least one pixel in the pixel array is saturated.

26. The method of claim 25 further comprising detecting a third motion event associated with the object from the plurality of images captured by the image sensor; and wherein the changing is implemented only if the third motion event is also detected within a second time period from detection of the second motion event.

27. The method of claim 25 further comprising changing the image sensor to the sleep mode if no motion event is detected within a third time period from the detection of a previous motion event.

28. A method for operating an optical navigation device comprising a touch input surface, and an optical source configured to direct optical radiation towards the touch input surface, the optical radiation to be reflected from an object adjacent the touch input surface, the method comprising:
capturing a plurality of images from an image array in an image sensor in the optical navigation device, the plurality of images being based upon the reflected optical radiation from the touch input surface;
operating the image sensor in one of a sleep mode for holding a motion indicator in a first state, and an active mode for setting the motion indicator to a second state different from the first state;
while in the sleep mode, detecting a first motion event associated with the object;
while in the sleep mode, buffering motion data derived from the first motion event, and
while in the sleep mode, changing the image sensor from the sleep mode to the active mode and providing the buffered motion data to be read external of the optical navigation device when a second motion event associated with the object is detected within a first time period from the detection of the first motion event, but remaining in the sleep mode and discarding the buffered motion data if at least one pixel in the pixel array is saturated.

29. The method of claim 28 further comprising changing from the sleep mode to the active mode only if a third motion event associated with the object is also detected within a second time period from the detection of the second motion event.

30. The method of claim 28 further comprising setting the motion indicator to the second state when the image sensor enters the active mode.

* * * * *